United States Patent [19]

Thompson

[11] 4,225,258
[45] Sep. 30, 1980

[54] PIVOT MECHANISM AND METHOD OF MANUFACTURING SAME

[76] Inventor: William E. Thompson, R.R. 1, Box 89, Middletown, Ind. 47356

[21] Appl. No.: 29,773

[22] Filed: Apr. 13, 1979

[51] Int. Cl.³ .............................................. F16C 11/06
[52] U.S. Cl. ...................................... 403/56; 403/141; 403/144; 403/270; 403/344
[58] Field of Search .................. 403/56, 76, 135, 140, 403/141, 142, 144, 310, 311, 265, 266, 267, 268, 269, 270, 271, 272, 408

[56] References Cited

U.S. PATENT DOCUMENTS

| | | | |
|---|---|---|---|
| 1,455,441 | 5/1923 | Hodny | 403/141 X |
| 3,130,989 | 4/1964 | Lannen | 403/142 |
| 3,497,248 | 2/1970 | Teramachi | 403/142 X |
| 3,999,872 | 12/1976 | Allison | 403/135 |

Primary Examiner—Wayne L. Shedd

[57] ABSTRACT

A ball and socket connector. A socket frame includes a pair of half tubes welded together with the opposite distal ends forming sockets bearingly receiving ball-shaped ends of a pair of elements. The half tubes are connected together at a location remote from the sockets thereby spring-biasing the socket-forming members against the ball-shaped ends. Planar surfaces are provided within each socket allowing the ball-shaped ends to contact the half tubes along a line of contact.

9 Claims, 5 Drawing Figures

PIVOT MECHANISM AND METHOD OF MANUFACTURING SAME

BACKGROUND OF THE INVENTION

This invention is in the field of ball and socket connectors. A useful type of joint for mechanical structures is the ball and socket joint. Such a joint is well known and is used to join two members together while allowing one member to pivot relative to the other member. Typically, the end of one member is configured as a ball or is at least partially rounded and is inserted into a spherical socket formed in the end of the opposite member.

In order to provide for ease of manufacture, assembly and adjustment, the socket member may include a pair of mutually opposed members secured together in some fashion. For example, in the U.S. Pat. Nos. 180,881 issued to H. Howsen and 1,455,441 issued to W. La Hodny, the pair of members forming the socket are secured together by a wing nut and bolt combination. Likewise the pair of members forming the socket may be crimped together such as shown in the U.S. Pat. No. 1,898,100 issued to N. Skillman. Similar approaches are shown in U.S. Pat. Nos. 1,912,780 issued to C. F. Lautz and 2,526,045 issued to H. C. Riemann. It is the general practice to use a sufficient number of fasteners or other fastening means to securely hold the pair of members together forming the socket along the length of the members.

Disclosed herein is a new structure for forming the traditional ball and socket connector. The pair of members forming the socket are attached together at a location remote from the socket so as to spring-bias the distal ends of the members together against the ball in cantilevered fashion. Further, the distal ends forming the socket are provided each with a flat portion to prevent damage of the ball by the socket members and also to ensure a line of contact between the ball and each socket member.

SUMMARY OF THE INVENTION

One embodiment of the present invention is a pivot mechanism comprising a first element including a rounded portion with a bearing surface and an arm extending outwardly from the rounded portion, and a frame including a pair of members with mutually opposed and spaced apart outer ends cooperatively forming a socket in which the rounded portion is located providing a joint between the element and frame, the pair of members are integrally attached together in a first location remote from the ends and extend in a cantilevered fashion from the first location to the ends spring-biasing the ends against the bearing surface.

It is an object of the present invention to provide a new and improved structure for a pivot mechanism.

A further object of the present invention is to provide a ball and socket connector wherein ball damage by the socket members is prevented.

In addition, it is an object of the present invention to provide a ball and socket connector wherein the socket members are cantileveredly mounted and are spring-biased against the ball.

Related objects and advantages of the present invention will be apparent from the following description.

DESCRIPTION OF THE PREFERRED EMBODIMENT

Figure 1:
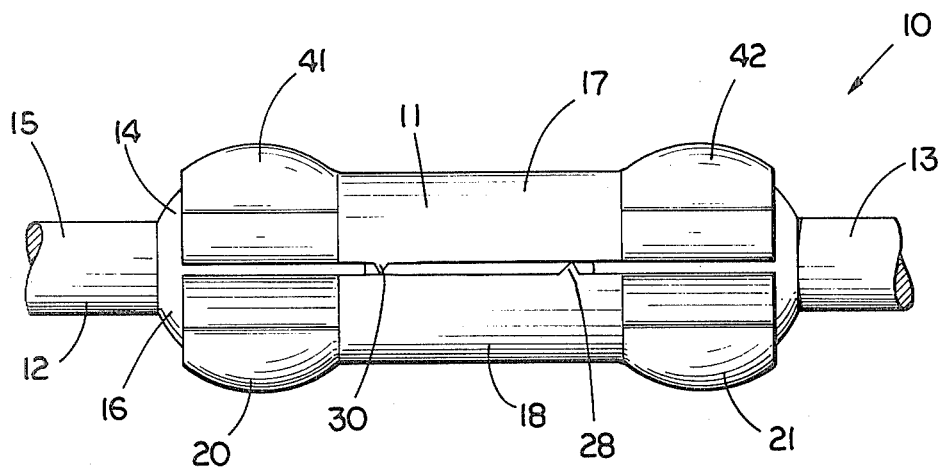
FIG. 1 is a side view of a double ball and socket connector incorporating my new invention.
Figure 2:
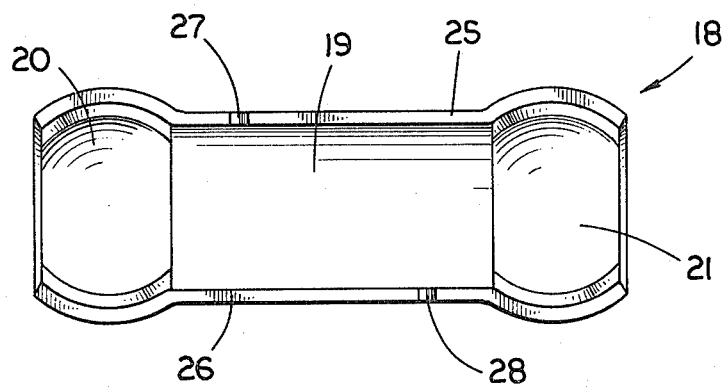
FIG. 2 is a top view of the bottom half tube member shown in FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a double ball and socket connector or pivot mechanism 10. The mechanism includes a socket frame 11 pivotally receiving a pair of ball-ended members 12 and 13.

Element 12 will now be described, it being understood that an identical description applies to element 13. Element 12 includes a rounded portion or ball-configured end 14 integrally attached to an arm 15 extending outwardly therefrom. Arm 15 is fragmented and it is understood that the arm may be longer and in turn attached at its opposite end to a ball and socket connector or to any type of structure such as a mounting plate or functional device such as a mirror. Rounded portion 14 includes a spherical bearing surface 16 which is received by the socket formed in frame 11.

Figure 3:
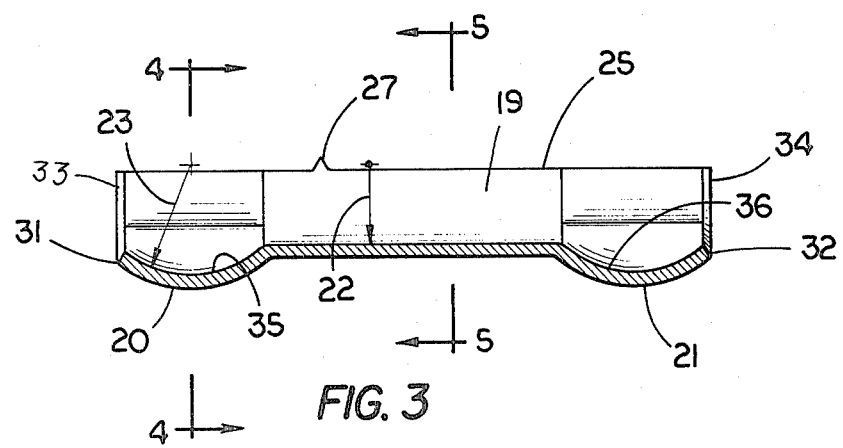
FIG. 3 is a longitudinal cross-sectional view of the half tube shown in FIG. 2.
Figure 5:
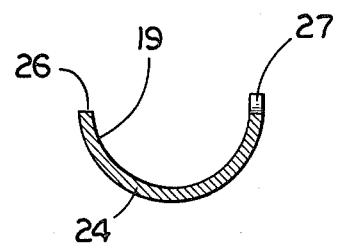
FIG. 5 is a fragmentary cross-sectional view taken along the line 5—5 of FIG. 3 and viewed in the direction of the arrows.

Frame 11 includes a pair of mutually opposed half tubes 17 and 18. Half tube 18 will now be described, it being understood that a similar description applies to half tube 17. Half tube 18 has a main body 19 with a pair of opposite distal end portions 20 and 21 which cooperatively form with half tube 17 the pair of sockets receiving elements 12 and 13. Main body 19 is semicircular in configuration and is of constant radius 22 (FIG. 3) at all locations along the longitudinal axis of the tube between end portions 20 and 21. As shown in FIG. 3, end portions 20 and 21 project beyond and beneath the outer surface of wall 24 (FIG. 5) forming main body 19. That is, outer portions 20 and 21 are defined by a radius 23 greater than radius 22. Both radii 22 and 23 pivot or extend from the longitudinal axis of tube 18.

A pair of projections or teats are located on the opposite longitudinally extending edges 25 and 26 of half tube 18. For example teat 27 is provided on edge 25 whereas teat 28 is provided on edge 26. Teats 27 and 28 are located respectively adjacent distal end portions 20 and 21.

Each half tube 17 and 18 is individually provided with a single teat on each of its longitudinally extending edges. In assembling the ball and socket connector, the longitudinal edges of half tube 17 are placed immediately over and aligned with the longitudinal edges of half tube 18. Half tube 17 is arranged so that the teats on its edges are positioned at the opposite ends from the teats on the edges of half tube 18. The rounded ends of elements 12 and 13 are inserted into the sockets formed by the mutually opposed half tubes 17 and 18. Half tubes 17 and 18 may then be held apart except at the location of the teats with an electric current then being passed through the teats forming a resistance weld at each teat so as to join half tube 17 to half tube 18. An insulating lubricant is provided on the rounded ends of each element 12 and 13 so as to prevent any current flow between the half tubes and elements 12 and 13. As shown in the side view of FIG. 1, half tube 17 is spaced apart from half tube 18 except at the location of teat 28 projecting upwardly from half tube 18 and except for the location of the teat 30 which projects downwardly from half tube 17 positioned adjacent distal end 20. Likewise, the half tubes are attached together by two resistance welds on two teats provided on the opposite sides of the ball and socket connector as viewed in FIG. 1.

The mutually opposed distal ends of half tubes 17 and 18 are spring-biased against the rounded or ball-shaped end which is fitted into the socket formed by the half tube distal ends. The amount of biasing may be controlled by the amount of spacing provided between half tubes 17 and 18. In one embodiment, each teat provided on the longitudinal edge of each half tube extended approximately 0.040 inches from the edge prior to welding. Subsequent to welding in the same embodiment, half tube 17 was either in contact with half tube 18 along their entire longitudinal edge or the edges were spaced apart between half tubes a maximum of 0.010 inches except for the points of attachment at the resistance welds. In this same embodiment, radius 22 was 0.290 inches whereas radius 23 was 0.340 inches.

Figure 4:
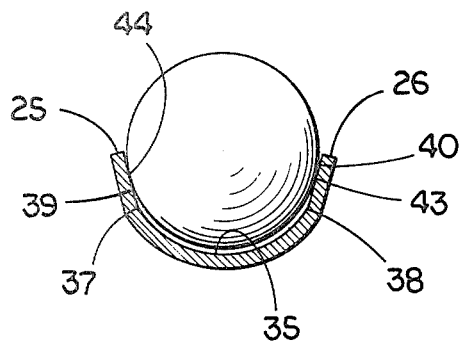
FIG. 4 is a fragmentary cross-sectional view taken along the line 4—4 of FIG. 3 and viewed in the direction of the arrows with the ball in position.

The outer distal ends 20 and 21 of half tube 18 terminate respectively at locations 31 and 32 (FIG. 3) which are located at an elevation equal to wall 24. Distal ends 20 and 21 then extend perpendicular to the longitudinal axis along respectively edges 33 and 34 terminating at the top longitudinal extending edges 25 and 26. Distal ends 20 and 21 have respectively an interior radius bearing surface 35 and 36 defined by radius 23 which extend upwardly terminating in a planar surface located on the opposite side walls of each distal end. For example, radius surface 35 (FIG. 4) extends upwardly to location 37 and 38 on the opposite side walls of the distal end to flat surfaces 39 and 40 which terminate at edges 25 and 26. Thus, when the ball-shaped end or rounded end of element 12 (FIG. 1) is inserted into the socket formed by the mutually opposed and spaced apart outer distal ends of half tubes 17 and 18, the rounded end contacts flat surfaces 39 and 40. Due to the spherical shape of the rounded end as compared to the planar surface 39 and 40, the ball-shaped end contacts the planar surface along a line of contact 44 on surface 39 and along a line of contact 43 along surface 40. The line of contact is approximately midway between location 38 and the top edge 26 and midway between location 37 and the top edge 25. The line of contact is parallel to the longitudinal axis of socket frame 11. Thus, the rounded end is prevented from disengaging the socket formed by the half tubes. Likewise, the top edges 25 and 26 will be spaced apart from the ball-shaped end thereby preventing gouging of the ball-shaped end by edges 25 and 26.

Half tubes 17 and 18 are integrally attached together by the resistance welding of the teats provided on the longitudinally extending edges of each half tube. The integral attachment allows the distal ends to extend outwardly in cantilevered fashion from the location of the welds thereby spring-biasing the distal ends against the bearing surface of the ball-shaped ends of elements 12 and 13. For example, distal ends 20 and 41 are spring-biased against bearing surface 16 and extend cantileveredly from teats 27 and 30. The points of attachment of half tube 17 to half tube 18 is at a location remote from the distal ends to provide the cantilever mounting effect. The cantilevered mounting location for distal ends 41 and 20 is present at teats or weld projections 27 and 30 which in turn is spaced apart from the location of the welds provided for the cantilevered mounting of distal ends 21 and 42.

While although a double ball and socket arrangement is shown in FIG. 1, it is understood that the present invention includes a single ball and socket connector. Likewise, although the double balls shown in FIG. 1 are arranged along a single longitudinal axis, it is to be understood that the present invention includes a multiple ball and socket arrangement wherein the balls are not located along a single axis.

Many advantages of the present invention are obtained as compared to the prior art structures. For example, the half tubes when welded together provide a three-part assembly including the two ball-shaped ends as compared to a 6-part conventional assembly. The assembly has a lower weight resulting from the fewer number of components. The half tubes may be fabricated in house by any company having a stamping press. The half tubes may be produced from a base material lower in cost amd more readily available as compared to conventional assemblies. Further, the present assembly can be manufactured by using a greater range of dimensional tolerances. The frictional resistance between the sockets and balls may be more accurately controlled. By cantileveredly mounting the socket-forming components, a pivot movement is provided which is much smoother as compared to the conventional structures. As a result of the flat surfaces provided in the sockets, sharp edges are prevented from contacting the spheres. Also, the weld assembly plan permits a more versatile routing during the manufacture of an assembly resulting in substantial cost savings in respect to labor hours, and the operational sequence. It is further believed that the subject assembly is better in appearance as compared to the prior art devices.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:
1. A pivot mechanism comprising:
   a first element including a rounded portion with a bearing surface and an arm extending outwardly from said rounded portion;
   a frame including a pair of members with mutually opposed and spaced apart outer ends cooperatively forming a socket in which said rounded portion is located providing a joint between said element and frame, said pair of members being integrally at- tached together in a first location remote from said ends and extending in a cantilevered fashion from said first location to said ends spring-biasing said ends against said bearing surface;

a second element including a second rounded portion with a second bearing surface and a second arm extending outwardly from said second rounded portion;

said members including second mutually opposed and spaced apart outer ends which cooperatively form a second socket in which said second rounded portion is located providing a second joint between said second element and said frame, said members being integrally attached together at a place remote from said second ends and extending in cantilevered fashion from said place to said second ends spring-biasing said second ends against said second bearing surface;

said members being integrally attached together at said first location which is spaced apart from said place, said frame having a tubular main body with a longitudinal axis and opposite socket ends, said rounded portion of both said first element and said second element being spherical in configuration bearingly received by said socket ends, said tubular main body being composed of said pair of members, each of semicircular cross section, said members including aligned opposite edges which extend along said axis, said tubular main body including a plurality of teats integrally joining opposite edges of said members together both at said first location and at said place.

2. The pivot mechanism of claim 1 wherein said pair of members are in contact with each other only through said teats.

3. The pivot mechanism of claim 2 wherein said teats are welded to said members with said rounded portion of said first element and said second element inserted in said socket ends and with lubricant located on said bearing surface.

4. A pivot mechanism comprising:
first and second elements each including a rounded portion with a bearing surface and an arm extending outwardly from said rounded portion;
a frame including a pair of members with mutually opposed and spaced apart outer ends cooperatively forming sockets in which said rounded portions are located providing a joint between said elements and frame, said pair of members being integrally attached together in a first location remote from said ends and extending in a cantilevered fashion from said first location to said ends spring-biasing said ends against said bearing surface and said outer ends including mutually facing inner surfaces, said inner surfaces each include a radiused portion and a flat portion, said flat portions of said inner surfaces being located closer together than the spacing between the radiused portions of said inner surfaces to provide a line of contact between each outer end and said rounded portions of said first and second elements.

5. A method of producing a ball and socket connector comprising the steps of:
providing a pair of members with mutually opposed outer ends cooperatively forming a socket;
inserting a ball-ended member into said socket;
placing lubricant on said ball-ended member;
holding said members apart except at a location remote from said outer ends; and
fastening said members together at said location to spring-bias said outer ends against said rounded element.

6. The method of claim 5 wherein said fastening step includes welding said members together at said location to spring bias said outer ends against said rounded element.

7. The method of claim 6 and further comprising the step of controlling the frictional resistance between said ball-ended member and said socket.

8. A pivot mechanism comprising:
a first element including a rounded portion with a bearing surface and an arm extending outwardly from said rounded portion;
a frame including a pair of members with mutually opposed and spaced apart outer ends cooperatively forming a socket in which said rounded portion is located providing a joint between said element and frame, said pair of members being integrally attached together in a first location remote from said ends and extending in a cantilevered fashion from said first location to said ends spring-biasing said ends against said bearing surface;
a second element including a second rounded portion with a second bearing surface and a second arm extending outwardly from said second rounded portion;
said members including second mutually opposed and spaced apart outer ends which cooperatively form a second socket in which said second rounded portion is located providing a second joint between said second element and said frame, said members being integrally attached together at a place remote from said second ends and extending in cantilevered fashion from said place to said second ends spring-biasing said second ends against said second bearing surface;
said members being integrally attached together at said first location which is spaced apart from said place;
said frame having a tubular main body with a longitudinal axis and at least two socket ends, said rounded portion of both said first element and said second element being spherical in configuration bearingly received by said socket ends, said tubular main body being composed of said pair of members, said members including aligned opposite edges which extend along said axis, said tubular main body including a plurality of weld projections integrally joining opposite edges of said members together both at said first location and at said place 9. A pivot mechanism comprising:
a first element including a rounded portion with a bearing surface and an arm extending outwardly from said rounded portion;
a second element including a rounded portion with a bearing surface and an arm extending outwardly from said rounded portion;
a frame including a pair of members with mutually opposed and spaced apart outer ends cooperatively forming sockets in which said rounded portion of said first element and said second element are located providing a joint between said element and frame, said pair of members being integrally attached together in a first location remote from said ends and extending in a cantilevered fashion from said first location to said ends spring-biasing said ends against said bearing surface of said first and second elements and wherein said frame has a tubular main body with a longitudinal axis, said rounded portion of said first and second elements being spherical in configuration bearingly received by said sockets, said tubular main body including a pair of members, said members including aligned opposite edges which extend at least partially along said axis, said tubular main body including a plurality of teats integrally joining opposite edges of said members together at said first location.

* * * * *